United States Patent [19]
Maurice et al.

[11] 3,922,932
[45] Dec. 2, 1975

[54] CRENELLATION DRUM; AND EPICYCLIC TRANSMISSION INCORPORATING THE SAME

[75] Inventors: Jean Maurice, St-Germain-la-Granche; Andre Mouttet, Boulogne, both of France

[73] Assignees: Regie Nationale des Usines Renault, St-German-la-Granche; Automobiles Peugeot, Boulogne, both of France

[22] Filed: Nov. 21, 1973

[21] Appl. No.: 417,902

[30] Foreign Application Priority Data
Nov. 24, 1972 France ............................ 72.41917

[52] U.S. Cl. .................. 74/763; 74/449; 74/750 R; 74/801
[51] Int. Cl.² F16H 1/32; F16H 55/12; F16H 57/08
[58] Field of Search .......... 74/801, 449, 763, 750 R, 74/753; 29/515, 516

[56] References Cited
UNITED STATES PATENTS
| | | |
|---|---|---|
| 2,076,926 | 4/1937 | Timmermann ........................ 74/801 |
| 3,011,365 | 12/1961 | Stoeckicht ............................ 74/801 |
| 3,599,512 | 8/1971 | Wayman ............................ 74/801 X |
| 3,780,601 | 12/1973 | Dach et al. ........................ 74/801 X |

Primary Examiner—Samuel Scott
Assistant Examiner—John Reed
Attorney, Agent, or Firm—Stevens, Davis, Miller & Mosher

[57] ABSTRACT

An epicyclic transmission comprising brakes and/or clutches in which a crenellated drum has a reaction element mounted thereon and held against axial sliding in at least one direction by abutment members upset from grooves of the crenellated drum adjacent smaller apertures the upset portions each having a profile of a double curvature extending between the associated aperture and the point of merging with the remainder of the crenellated drum, when viewed in cross-section on an axial plane.

4 Claims, 12 Drawing Figures

CRENELLATION DRUM; AND EPICYCLIC TRANSMISSION INCORPORATING THE SAME

The present invention relates to a device for axial immobilisation of an element with respect to a crenellated or castellated drum, more particularly in a gear box mechanism.

In an automatic gear box having an epicyclic gear train it is known to utilise in the brakes or clutches drums which in transverse section have a crenellated appearance and which are generally utilised for simultaneously entraining by the inside and the outside multi-disc clutch discs, the role of the latter being to render the input shaft of the train rotatably integral with the components of the planetary gear train such as planet gears, ring gears or planetary carriers, or to immobilise these components.

Such assemblies may be comprised of a clutch drum and a plate supporting the discs of this clutch, or of a clutch drum and a ring gear of the epicyclic gear train rotatably driven by this drum.

It is known that the ring gear of an epicyclic gear train is subjected to the component of the axial thrust force generated by the helicoidal form of the teeth in engagement with the planet gears, this thrust force being directed in one or the other direction depending on the direction of torque transmission, and that the plate supporting the disc of a multi-disc clutch constitutes a reaction element to the thrust exerted by the hydraulic control jack of the clutch.

Now, because of the magnitude of the said axial thrust forces it is necessary to utilize a device for axially immobilising the ring gear and for axial abutment of the supporting table or plate.

Moreover, these crenellated drums are mostly made of sheet metal and their castellated profile is generally obtained by deformation from a cylindrical drum, which entails serious difficulties for producing an axial abutment or axial immobilisation means.

For producing an axial abutment it is known to employ a device comprised of a resilient stop ring which is housed within an internal groove of the drum, notching the crenellated profile of the drum.

A device for complete axial immobilisation of a component can be obtained by introducing into the component two such resilient stop rings each housed in a groove identical to the groove described above for use in an axial abutment.

However these known devices have the following disadvantages:

The grooves which are machined by transversely notching the crenellations in the castellated drum are difficult to produce since the tools work by impact when passing from one crenellation to the next. Moreover, the multitude of small imperfections created by this machining operation are difficult and costly to remove since they are situated on the sides and in the bottoms of the crenellations.

The resilient stop rings do not constitute a reliable abutment solution since they can be dislodged under the effect of repeated thrust forces. In order to reduce this danger care is taken, during the machining of these grooves, to ensure extreme precision of the perpendicularity of the sides with respect to the drum axis.

The present invention enables the above-mentioned drawbacks to be obviated by producing abutments without a cutting machining operation and without the need for any such resilient stop ring.

According to the present invention there is provided a drum of crenellated transverse section, and having at least one set consisting of at least three axial abutment members projecting with respect to the profile of grooves of the crenellation, each said abutment member comprising an upset surface portion of the drum groove wall adjacent an aperture of the drum groove wall, said upset portion having in a sectional plane axially of the drum a profile of developing aspect having two successive oppositely directed cruvatures and extending from an edge of the orifice as far as the extremity of the upset surface portion where the upset portion tangentially joins the general profile of the groove of the crenellation, said edge being disposed in a plane perpendicular to the axis of the drum and said orifice being smaller than the upset wall portion and said orifice and said upset portion being disposed on opposite sides of said plane.

The special profile of this point of upset is defined so as to ensure the maximum of frontal abutment surface for the component to be immobilised, as well as minimum flexure under the thrust energy by good diffusion of the energy of the abutment surface toward the crenellated remainder of the drum.

At least one set of at least three abutments defines a plane perpendicular to the axis of the drum and safeguards the entire bearing surface of the component.

In order that the present invention may more readily be understood the following description is given, merely by way of example, with reference to the accompanying drawings in which.

Figure 1:
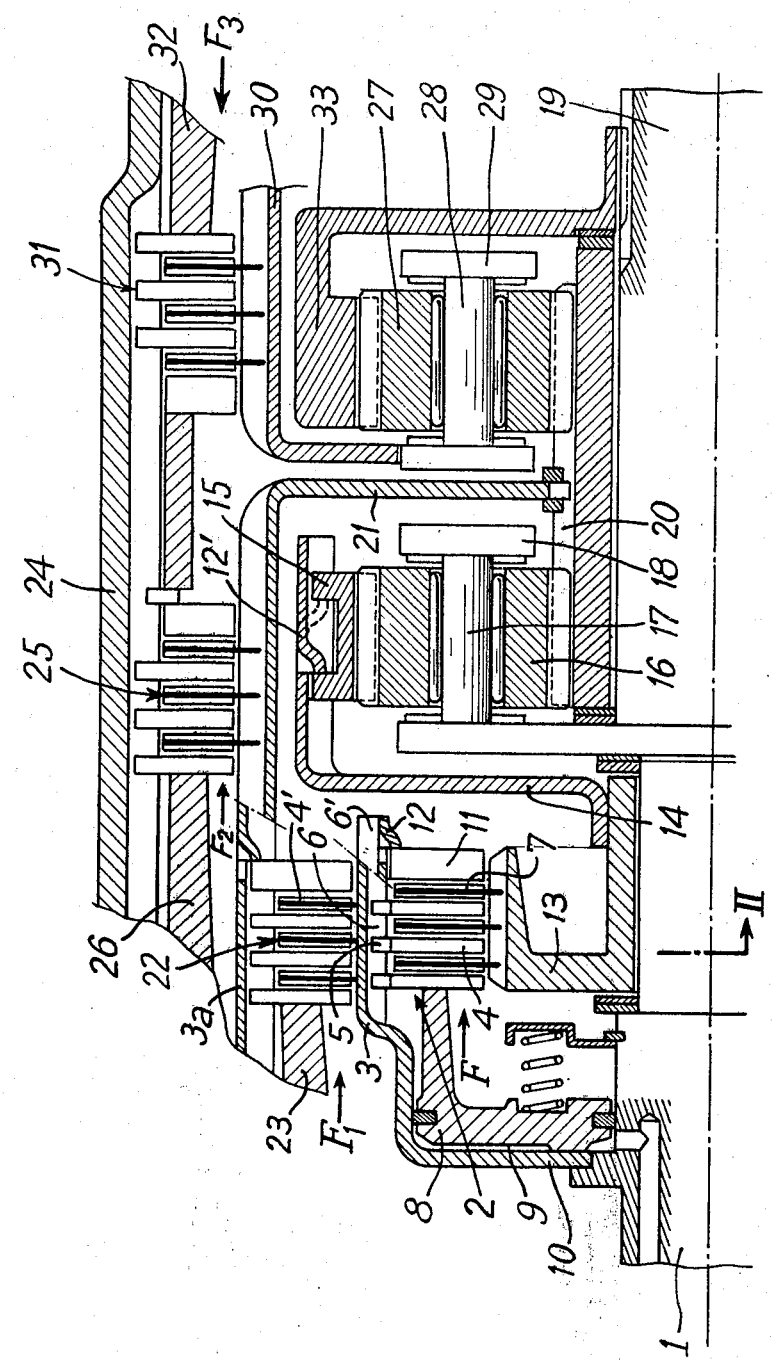
FIG. 1 is a partial view in longitudinal section of an automatic transmission having several epicyclic gear sets.
Figure 2:
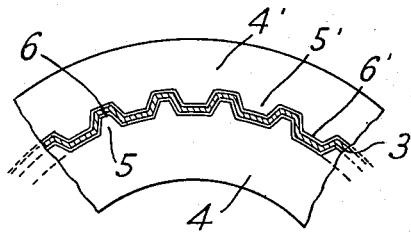
FIG. 2 is a view in partial transverse section along the line II—II of FIG. 1.

In FIG. 1 there is shown an epicyclic transmission which comprises an input shaft 1 rotatably integral with a first multi-disc clutch which is generally referenced 2 and consists of a crenellated drum 3 (FIGS 1 and 2), and driving clutch discs 4 rotatably integral with the drum 3 by their teeth 5 complementary to the internal notches 6 of the drum 3. Between the driving discs 4 there are disposed driven discs 7 which are integral with a boss 13 connected to a further drum 14. The driven discs 7 are clutched to be rotated by the driving discs 4 when a piston 8 is actuated in the direction of the arrow F by the effect of a hydraulic fluid under pressure acting between an axial end face 9 of the piston and the end wall of a cylinder portion 10 of the drum. The driving discs 4 and the driven discs 7 are compressed together between the piston 8 and a counterpressure plate 11 axially immobilised by a set of abutment members 12 which are formed in accordance with the present invention. The driven discs 7 ensure the rotary entrainment of the boss 13 which is in turn connected to a drum 14 in which a first ring gear 15 is axially immobilised by a set of abutment members 12' again formed in accordance with this invention. The ring gear 15 meshes with a first set of planet gears 16 mounted on shafts 17 carried by a first planetary carrier 18 connected to an output shaft 19.

The first set of planet gears 16 meshes with a sun gear 20 rotating integrally with a further crenellated drum 21, partly shown. The drum 21 may either be driven to rotate by the drum 3 whose radially outer grooves 6' entrain the teeth 5' of the driving discs 4' (FIGS. 1 and 2) of a second multi-disc clutch 22 when a piston 23, partly shown in FIG. 1, is driven in the sense of arrow $F_1$ to actuate the clutch, or it may be rendered integral with an outer transmission housing 24 when a first multi-disc brake 25 is actuated by a further piston 26 in the direction of arrow $F_2$.

A second set of planet gears 27 rotatably mounted on shafts 28 carried by a second planetary carrier 29 connected to a further crenellated drum 30, partly shown in FIG. 1, is also in engagement with the sun gear 20. The second planetary carrier 29 can be rendered integral with the housing 24 when a second multi-disc brake 31 is actuated by movement of a piston 32, partly shown, in the direction of arrow $F_3$. A second ring gear 33 meshes with the second set of planet gears 27 and is rotatably integral with the output shaft 19.

Such a transmission makes it possible to obtain in a known manner three forward speeds and a reverse speed by selectively actuating the two clutches 2 and 22 and the two brakes 25 and 31 in accordance with the following diagram of sequences:

|              | 1st | 2nd | 3rd | Rev. |
|--------------|-----|-----|-----|------|
| 1st clutch 2 | x   | x   | x   |      |
| 2nd clutch 22|     |     | x   | x    |
| 1st brake 25 |     | x   |     |      |
| 2nd brake 31 | x   |     |     | X    |

In accordance with the invention the crenellated drums 3, 3a of the clutches 2 and 22 comprise abutment members 12 to hold a counterpressure plate such as 11, while the drum 14 comprises abutment members 12' utilised for axial immobilisation of the ring gear 12.

Figure 3:
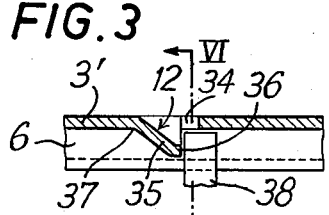
FIG. 3 is a detail view showing a first embodiment of abutment member obtained by upsetting, in axial section along line III of FIG. 4.
Figure 4:
FIG. 4 is a detail view of the abutment member of FIG. 3 seen from above.

In FIGS. 3 and 4 there is shown one embodiment of such an axial abutment member 12 for an internal element 38 in a crenellated drum 3'. The abutment member 12 is formed in the bottom of the internal groove 6 of the crenellated drum 3' by an upsetting operation in the course of which the wall of the drum 3' has punched therein an orifice 34 extending peripherally of the drum substantially over the width of the groove 6. The wall of the drum 3' adjacent the orifice 34 is shaped so as to have a deformed surface 35 directed toward the interior of the groove 6 and has in axial section a profile of developing aspect comprising two successive oppositely directed curvatures extending from a land 36 to an extremity 37 joining the undeformed crenellation wall. These two curvatures are so oriented that the end face of the land 36 is in a plane substantially perpendicular to the axis of the drum 3' and that the deformed surface 35 tangentially joins the general profile of the groove 6 along the extremity 37.

Figure 5:
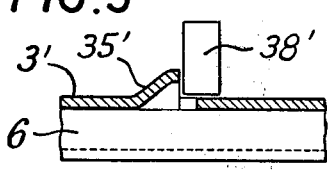
FIG. 5 is a view representing an alternative embodiment of an abutment member.

It is clear that this abutment member may alternatively be obtained by upsetting in the bottom of the external groove 6' and constitute an axial abutment for a disc supporting plate such as 11, as is shown in FIG. 1. This arrangement is shown in FIG. 5.

Forming abutment members by an upsetting operation, in this manner, enables the disadvantages of the above described prior art solutions to be eliminated and more particularly solves the tricky problem of deburring. The orifice 34 can equally be punched outwardly from the inside of the drum when it is situated at the bottom of the internal groove 6 and inwardly from the outside when it is situated at the bottom of the external groove 6'. Thus the burr which is always present where the punching debouches is easily accessible since it will be situated on either the largest external diameter or on the smallest internal diameter of the crenellated profile of the drum. Moreover, it is known that a punching burr is smaller than a machining burr so there is much less danger of its becoming detached during the operation of the transmission.

Figure 6:
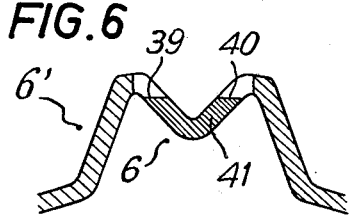
FIG. 6 is a view in transverse section of the abutment member of FIG. 3 seen along the line VI—VI of FIG. 3.

In FIG. 6 there is shown an alternative embodiment of an external abutment member situated at the bottom of the internal groove 6 obtained by punching, the deformed surface 35' of the wall being directed toward the exterior of the groove 6. This upsetting point may serve as abutment for an element 38' exteriorly of the drum 3'.

FIG. 6 is in the form of a section, perpendicular to the axis of the drum 3', showing the configuration of an abutment member, obtained by upsetting. This section has a V-shape with the arms 39 and 40 of the V connected by their ends to the general profile of the groove. The deformation is obtained toward the interior of the internal groove 6.

The cross-hatched portion 41 represents the axial abutment zone of the land 36 which is in a plane substantially perpendicular to the axis of the drum.

Figure 7:
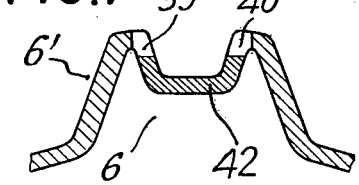
FIG. 7 is a view in transverse section of a further embodiment of an abutment member.

A further embodiment of the abutment member is shown in FIG. 7, where the section of the abutment member, in a plane perpendicular to the axis of the drum, is U-shaped. The arms 39' and 40' of the U are connected by their ends to the general profile of the groove. The hatched portion 42 represents the axial abutment zone. THis U configuration is particularly suitable for large grooves and/or where the axial thrust force is great.

Figure 11:
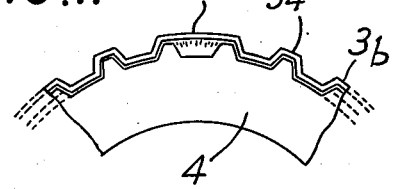
FIG. 11 is a frontal view of an abutment member in a crenellated drum of irregular pitch.

The crenellated drum 3b of irregular pitch shown in FIG. 11 comprises some grooves 53 which are larger than other grooves 54, and in this case it may be advantageous to place the upset points of the abutment members in a number of different grooves such as the grooves 53 which are larger and are distributed over the periphery of the drum.

Figure 9:
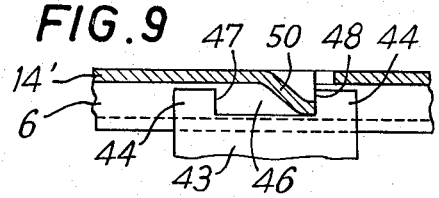
FIG. 9 is a view in partial section along line IX—IX of FIG. 8.
Figure 8:
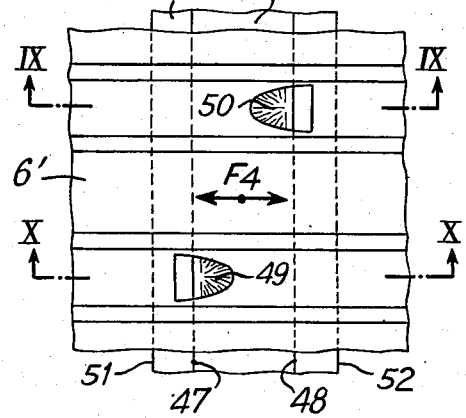
FIG. 8 is a partial view from above showing a first device for immobilising a ring gear in a crenellated drum.
Figure 10:
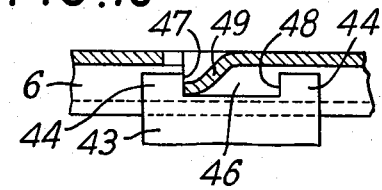
FIG. 10 is a view in partial section along line X—X of FIG. 8.

In FIGS. 8, 9 and 10 there is shown a first mode of immobilisation of a ring gear 43 held within a drum 14' comprising internal grooves 6 and external grooves 6', the said ring gear 43 being driven to rotate by the drum 14' by means of teeth 44 on the ring gear which are complementary to the grooves 6 of the drum. A median groove 46 in the ring gear, axially defined by the faces 47 and 48, has been machined in the teeth 44. Two sets of oppositely facing abutment members 49 and 50 have been formed, by upsetting, in the wall of the drum 14' at the bottom of the internal grooves 6 and projecting toward the interior of the drum. The set of abutment members 49 is opposed to the set of abutment members 50 in such manner that the two sets define respectively two abutment planes which are mutually parallel and also perpendicular to the axis of the drum 14, against which abutment planes the respective bearing faces 47 and 48 are capable of abutting upon axial displacement of the ring 43 in accordance with the double arrow $F_4$.

The axial immobilisation device of the invention may thus especially be applied to a ring gear of a planetary gear train, such as the ring gear 15 shown in FIG. 1, and which is to be immobilised relative to the drum 14.

This device enables a very compact structure to be obtained since it is comprised within the width of the ring. It will of course be necessary to punch the drum once the ring gear is in place, unless the drum is to be formed of two halves joined along an axial plane after punching and after fitting around the ring gear. Moreover, this device offers the advantage of exposing completely the two lateral faces 51 and 52 of the ring gear, which represents an interesting feature when the crown itself serves as axial abutment member for other components.

Figure 12:
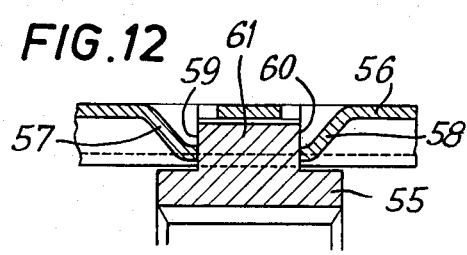
FIG. 12 is a view in axial section of another way of immobilising a ring gear in a crenellated drum.

In FIG. 12 there is shown a further mode of producing a device for immobilisation of a ring gear 55 wherein the drum 56 comprises two abutment member sets 57, 58 disposed in such manner that their lands face one another and form two mutually parallel planes 59, 60 substantially perpendicular to the axis of the drum, between which planes a collar 61 of the drum 55 is held axially immobilised.

In the various embodiments of abutment members described above and illustrated in the drawings the aperture 34 enables the ring gear or counterpressure plate to be accurately placed in position by visual observation through the apertures 34 so that the punching operation can be carried out without damage to the ring gear or counter-pressure plate already in position. Moreover, the aperture 34 can be prepunched with the use of a correspondingly shaped anvil to ensure a sharp line of demarcation of the aperture and this enables the subsequent upsetting operation to be carried out without the use of an anvil.

By ensuring that the upset portion 35 has a side view with oppositely directed curvatures, i.e. the left-hand upwardly convex base portion in FIG. 3 followed by the upwardly convex portion at the right-hand of the abutment member 5 in FIG. 3, it is possible to ensure that the part of the upset portion 35 near its free edge (the right-hand edge in FIG. 3) is a portion which in any axial section is parallel to the axis of the drum. In this way the end portion is merely subjected to a "hoop stress" type of deformation whereas the remainder of the abutment member will be partly in "hoop stress" and partly in "longitudinal stress" deformation which would tend to distort the end wall from the "planar" configuration required. This distortion is overcome by ensuring that the end portion is merely subjected to "hoop" deformation.

The person skilled in the art can, of course, make various modifications to the devices or methods which have been described solely by way of non-limiting Examples, without thereby departing from the framework of the invention as defined by the appended statement of claim.

We claim:

1. An epicyclic transmission including a ring gear having a toothed inner face and a splined outer face, a sun gear coaxially within said ring gear; a plurality of planet gears in nesting contact with and between said sun gear and said ring gear; a crenellated drum whose crenellations define grooves to receive the splined outer face of said ring gear; two sets of abutment members formed on said crenellated drum, each set of abutment members being arranged on a respective plane transverse to the drum axis and the abutment member of the sets being oppositely disposed, abutment faces of said ring gear arranged in respective abutment planes transverse to the axis of said ring gear for abutment with the abutment faces of said abutment members; and apertures in said grooves of the crenellated drum adjacent said abutment members, said abutment members each comprising an upset portion of a groove of said crenellated drum, said upset portion having a profile when viewed as a cross-section on an axial plane of the drum which extends continuously from said aperture through a first zone of a given curvature and then a second zone of a reversely directed curvature to merge with the groove of the crenellated drum, said aperture having a smaller extent than the upset portion when viewed as a development of the drum, and the abutment edge being at the edge of said abutment member closest to said aperture and shaped to lie in the respective abutment plane.

2. A transmission as set forth in claim 1, wherein said upset wall portion forming each abutment member has, when viewed in cross-section on a plane perpendicular to the axis of the drum, a profile of V configuration, said V having arms which are connected by their ends to the general profile of the groove of the crenellated drum.

3. A transmission as set forth in claim 1, wherein said upset wall portion forming each abutment member has, when viewed in cross-section on a plane perpendicular to the axis of the drum, a profile of U configuration, said U having arms which are connected by their ends to the general profile of the groove of the crenellated drum prior to formation of the abutment member.

4. A transmission as set forth in claim 1, wherein the crenellations of the drum include grooves of unequal width, and said abutment members are shaped on the grooves of greater width.

* * * * *

UNITED STATES PATENT AND TRADEMARK OFFICE
CERTIFICATE OF CORRECTION

PATENT NO. : 3,922,932
DATED : December 2, 1975
INVENTOR(S) : Jean Maurice et al It is certified that error appears in the above—identified patent and that said Letters Patent are hereby corrected as shown below:

[73] Assignee: Regie Nationale des Usines Renault, Billancourt, France; Automobiles Peugeot, Paris, France Signed and Sealed this twenty-seventh Day of April 1976

[SEAL]

Attest:

RUTH C. MASON
Attesting Officer

C. MARSHALL DANN
Commissioner of Patents and Trademarks